United States Patent [19]

Barnard

[11] Patent Number: 4,540,489

[45] Date of Patent: Sep. 10, 1985

[54] COMPACT WATER PURIFYING DEVICE

[76] Inventor: Royal W. Barnard, 79 Davis St., Rutland, Vt. 05701

[21] Appl. No.: 542,998

[22] Filed: Oct. 18, 1983

[51] Int. Cl.³ .............................................. B01D 27/02
[52] U.S. Cl. .................................... 210/287; 210/315; 210/338; 210/435; 210/501
[58] Field of Search .............. 210/264, 266, 282, 283, 210/284, 285, 287, 288, 314, 315, 316, 317, 320, 335, 336, 337, 338, 342, 416.2, 416.3, 440, 443, 447, 501

[56] References Cited

U.S. PATENT DOCUMENTS

| | | | |
|---|---|---|---|
| 3,167,399 | 1/1965 | Hansen, Jr. | 210/288 |
| 3,349,919 | 10/1967 | Royer et al. | 210/338 |
| 3,780,867 | 12/1973 | Zirlis | 210/282 |
| 3,950,251 | 1/1976 | Hiller | 210/288 |
| 4,058,463 | 11/1977 | Bartik | 210/317 |
| 4,145,291 | 3/1979 | Console et al. | 210/501 |
| 4,212,743 | 7/1980 | Van Meter et al. | 210/288 |

Primary Examiner—Richard V. Fisher
Assistant Examiner—Wanda L. Millard
Attorney, Agent, or Firm—Charles A. Brown; Charles E. Brown

[57] ABSTRACT

A compact water purifier is described in which three filters are contained within a single container. The first filter in the sequence is a pre-filter designed to remove large particles from the flow stream, the second an activated carbon filter for the adsorption of toxic chemicals, and the third a ceramic microscreen, preferably containing silver or other bacteriostatic agent. The three filters are assembled within a cylindrical container which is sealed to the filter assembly at each end so that a substantially uniform inward flow pattern and stable flow rate are established, and so that the relative volumes of the carbon and ceramic materials are appropriate for their functions, and so that each filter medium is assured to retain its proper position within the prescribed filtering sequence.

2 Claims, 3 Drawing Figures

COMPACT WATER PURIFYING DEVICE

FIELD OF THE INVENTION

This invention relates to a method and apparatus for water purification. More particularly, the invention relates to a compact and inexpensive water purification device in which a single housing contains a plurality of filter elements and in which a water flow pattern is established such that all of the filters are most effectively used, and by such method nearly any unpotable fresh water source can be made potable, in compliance with known health standards.

BACKGROUND OF THE INVENTION

It is well known that the quality of water typically supplied to households from private sources or municipal water treatment plants and the like can be improved by the filtration therefrom of various contaminants. These contaminants can take on a variety of forms, including relatively large particles such as sand, inorganic materials including such things as lead, mercury, iron, and nitrates, which are associated with "hard" water, and organic compounds of wide variety, as well as tiny pathogens such as bacteria, spores and the like. It is known to employ differing filters to filter out such differing contaminants, and as much as many devices claim to supply "pure" water, this is the only unit of its type which can be demonstrated to meet U.S. standards for "potable" drinking water.

The prior art shows a wide variety of elaborate devices designed to purify water. None of these are as suitable as would be desired. For example, various prior art devices are unduly expensive, are of great complexity, require supply of electrical power, have operator training requirements and use undesirable chemical bactericidal techniques, or are simply unreliable, as well as varying combinations of these. These processes include such things as reverse osmosis filtering, and distillation processes, all of which are, as noted, generally too complicated and expensive for the average homeowner even in the United States, and are much less suitable for developing and Third World nations, where simplicity and low cost are crucial to the success of any drinking water purification unit. Others, such as compressed carbon filters have inadequate protection against plugging and insufficient reliability for the removal of pathogens.

It is also important in a water purifier for home use that means be provided to sterilize any bacteria which do survive the filtration process and moreover that no breeding ground for bacteria be established downstream from the bacterial filter, which has, in fact, occurred with certain prior art designs.

It is clear, therefore, that a need exists for an improved and reliable purification device.

Another factor which requires consideration in the design of a water purification device, particularly for household use, is that it be easy to install and simple to service. Prior art multiple filter designs have necessitated the mounting and connection by plumbing of plural containers containing the plural types of filters, which is sufficiently complex to dissuade many householders from attempting to attach water purification systems in their home drinking water supply systems. Moreover, such plural containers are wasteful of space and cost more than would a single container containing all types of filters necessary for adequate water purification.

The design of a successful water filter containing plural media for filtration purposes also involves selection of the relative amounts of media contained and their arrangement in such a way that the water is presented to each for an appropriate amount of time such that the respective contaminants can effectively be removed by each filter. For example, in the case of an activated carbon filter, the critical issue to ensure proper carbon adsorption of impurities is the contact time of the influent water to the carbon. This is a function of flow rate, the volume of carbon available and the design of the filter itself. Many prior art carbon filters as documented by reports done for the Office of Drinking Water U.S. Environmental Protection Agency under Contract No. 68-01-4766, have too large a flow rate in relation to the volume of carbon contained therein and do a poor job. Others are badly designed and do not ensure that the water flows evenly through the filter so that inconsistent results are obtained. Carbon filters also provide a potential breeding ground for bacteria and although some manufacturers use silver, a known bacteriostatic agent, in their carbon filters, none have shown positive results in reducing bacterial contamination. As in the case of carbon adsorption, silver sterilization of bacteria requires both a relatively long contact time and a proper water pH level, for effectiveness.

It is known to use a ceramic microscreen to screen out such things as bacteria, spores and other pathogens and to impregnate this with bacteriostatic silver. However, it is important that this ceramic filter be placed in the water flow pattern at a point where it will have the maximum effectiveness, and this has not always been done in the prior art. One prior art design even places a carbon core within a cylindrical ceramic microscreen to reduce bad taste and odor, thus providing a bacteria breeding ground placed in the water flow pattern after the ceramic bacteria filtering stage.

OBJECTS OF THE INVENTION

Accordingly, it is an object of the invention to provide an improved water filter for home use in which plural media are provided in a single sealable container and in which a water flow pattern is established from an inlet port to an outlet port through the media in sequence so that all water passes through the media in the proper order.

It is a further object of the invention to provide a water purification unit suitable for home use which is efficacious in removing all sorts of dangerous and undesirable elements from the water, while not requiring mechanisms, electrical power supply, complex control devices or human operator attention and avoiding use of chemical bactericides (e.g. chlorine or iodine) and thus requiring subsequent chemical removal.

A further object of the invention is to provide an improved home water filtration device which is of a passive type; that is, comprising only flow-through filters and similar passive devices so that no moving parts, control circuitry or the like is required.

It is a further object of the invention to provide a water filter which provides improved results in terms of disinfection and clarity of the water without undue expense or complexity.

It is a further object of the invention to provide a mixed media water filter in which the relative sizes of the media and the water flow rate therethrough are controlled to be appropriate for the filtration operation carried out by each of the media.

It is an additional object of the invention to provide a water filter in which a single housing encloses three filtration media, a prefilter to remove large contaminants, an activated carbon filter and a ceramic fine filter in such a way that the sequence of water flow therethrough is completely defined and all water passes through the three filters in the precise sequence mentioned.

SUMMARY OF THE INVENTION

The present invention satisfies the needs of the art and objects of the invention mentioned above by provision of a three-stage mixed media filter within a single canister. In the preferred embodiment, the canister is cylindrical and the three filters fit concentrically therewithin. A generally radially inward water flow pattern is established from the outermost of the media to the inner, and the relative sizes of the media are selected so that the residence time of the water in each of the media is appropriate to the function carried out. In a particularly preferred embodiment, the outermost filter is a pre-filter having a pore size of approximately five (5) microns, the subsequent filter is an activated carbon filter and the innermost filter is a ceramic material which may also comprise a bacteriostatic agent such as silver nitrate, so as to disinfect the water by sterilizing any bacteria which might survive the torturous path through the ceramic microscreen material. The cylindrical filter assembly is sealed to the container at top and bottom so that a volume of pressurized water is juxtaposed to the outside of the carbon and the ceramic filters at all times, whereby a substantially uniformly inward flow pattern is defined. The ceramic filter may be sealed directly to one end of the container and the outlet port established in communication therewith. The overall goals of the invention are thus achieved with the provision of a compact, one container filter which contains the three media in a configuration which ensures water flow therethrough in the proper sequence, ensuring proper filtration.

BRIEF DESCRIPTION OF THE DRAWINGS

The invention will be better understood if reference is made to the accompanying drawings in which.

DESCRIPTION OF THE PREFERRED EMBODIMENTS

Figure 1:
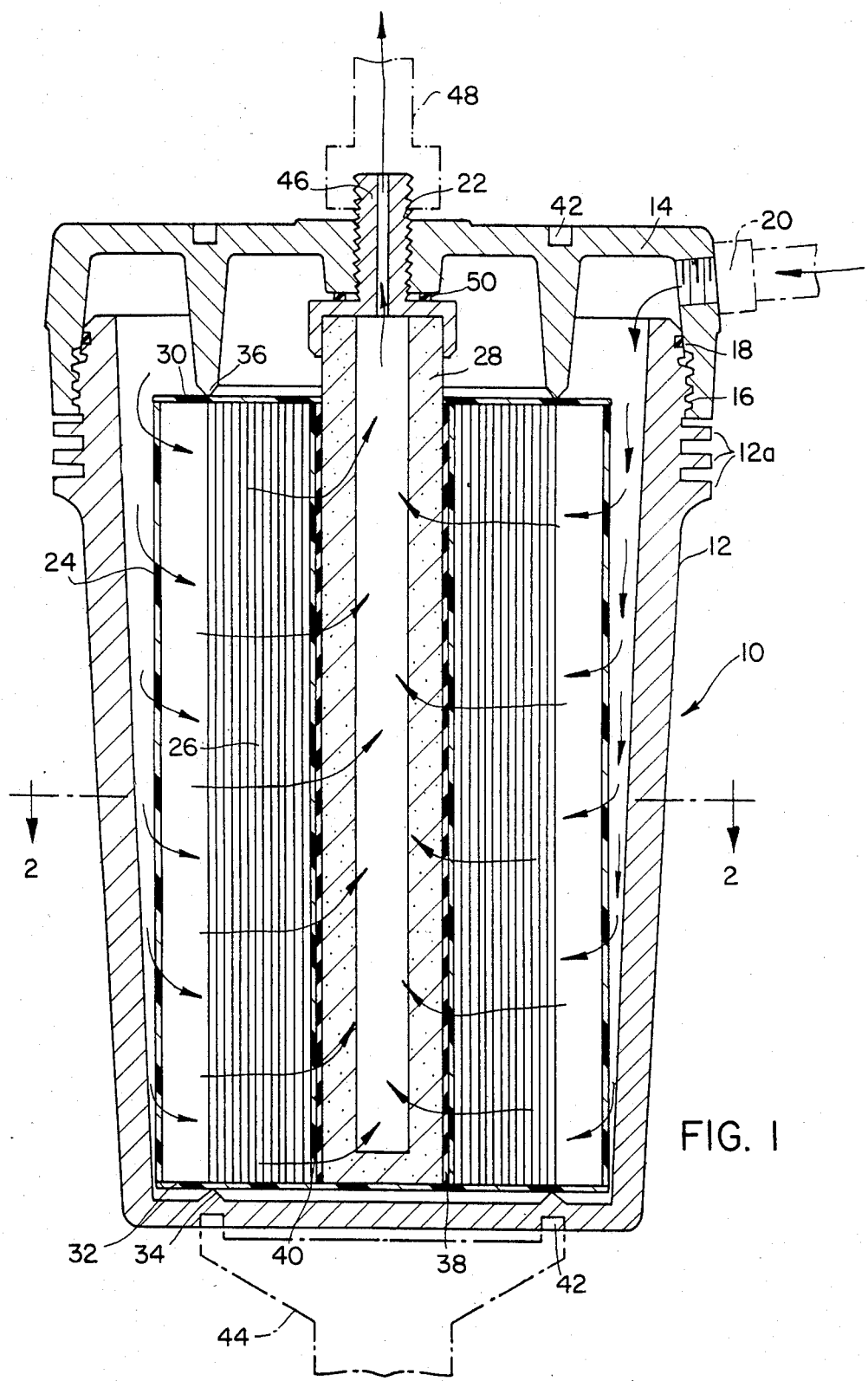
FIG. 1 represents a cross-sectional view of the filter of the invention taken parallel to the axis of the generally cylindrical filter housing.
Figure 2:
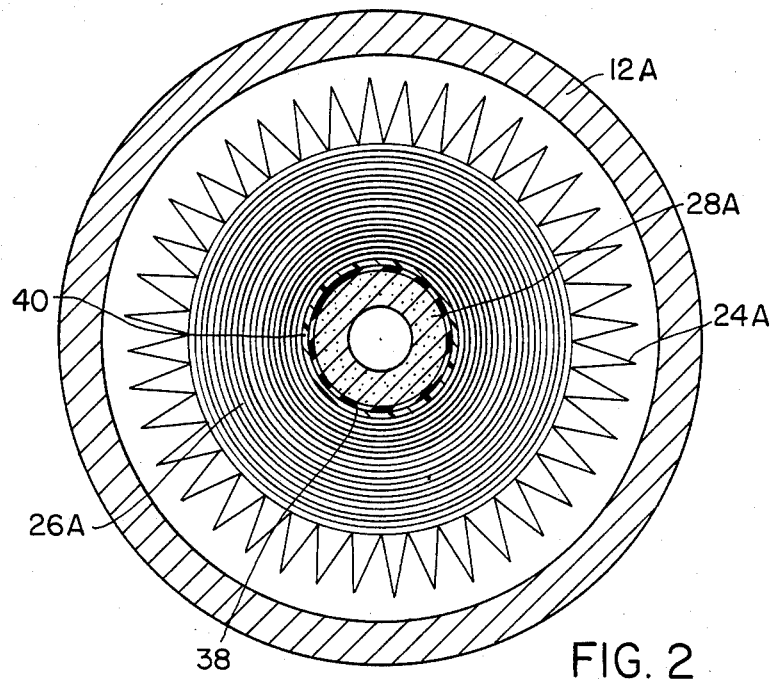
FIG. 2 is a cross-sectional view along line 2—2 of FIG. 1.
Figure 3:
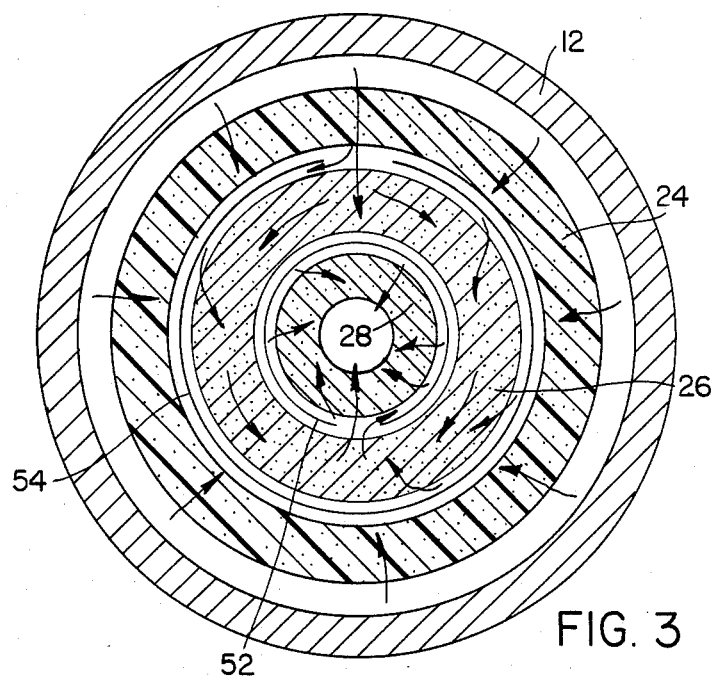
FIG. 3 is a view comparable to FIG. 2 showing an alternative embodiment of the invention.

The filter according to the invention is shown in FIGS. 1, 2 and 3. The several media used are all contained in a single generally cylindrical canister 10 comprising a lower portion 12 which is generally cup- or bucket-shaped, and a cap 14 which is threadedly attached to the lower portion 12 by threads 16. An O-ring seal 18 is provided to seal the cap 14 to the body portion 12. As shown in FIG. 1, the O-ring 18 fits within a groove formed in the container body 12. The cap and body are injection-molded of plastic material and water enters the interior of the container 10 through an inlet port 20 and exits by way of an outlet port 22.

Within the container 10 are three filters. The first or pre-filter 24 is in one preferred embodiment a pleated paper member having pores of five micron diameter. In the example shown, the second filter is a spiral wound activated carbon member 26, comprising charcoal on a paper backing. Other means of providing prefiltration and carbon adsorption are within the scope of the invention and are discussed below. The third filter member is a ceramic "candle" 28 which is a closed-ended tube. The candle 28 fits within the spiral wrapped activated carbon filter 26 which in turn is enclosed by the pleated paper filter 24. At the top and bottom of the assembly are provided resilient sealing members 30 and 32. These may be made of any resilient food grade material capable of sealing, e.g., silicone rubber, polyvinylchloride, and the like. The upper sealing member 30 is generally O-shaped having a hole in its center for the ceramic candle 28, while the lower sealing member 32 is circular. These interact with circular dimples, 34 and 36 at the bottom and the top of the canister respectively, and thus provide seals at the two ends of the filter assembly when the cap is tightened down. The water flow is therefore from the inlet port 20, radially inwardly through the pleated paper filter 24 and the wrapped activated carbon filter 26, and then inwardly into the ceramic candle 28 and outwardly through the outlet port 22. Uniform radially inward flow is ensured by providing that the pleated paper filter 24 and the activated carbon filter 26 do not fit tightly within the container 10, so that a volume of pressurized water is effectively juxtaposed to the exterior of the carbon filter 26 at all times so that water is continually being pressed inwardly thereagainst. Typically, very little pressure drop is caused by the pleated paper filter 24, so that adequate pressure is exerted to push the water through the carbon filter 26; similarly the pressure drop across the carbon filter 26 is such that a volume of water is in pressurized contact with the exterior of the ceramic candle, assuring uniformly inward flow. The sizing of the carbon filter 26 is chosen so that even at the maximum flow rate permissible through the outlet port 22, the inlet water has adequate residence time within the activated carbon member 26 and the ceramic candle 28 that effective adsorption, filtration and bacteriostatic action take place.

The invention has been successfully tested in a prototype embodiment, in which a synthetic rope spiral wound pre-filter and the rolled activated carbon filter 26 were purchased from The Filterite Corporation. It is well understood in the art that the term "activated" means that the carbon is of a granular nature, typically having been heated in a reducing atmosphere, so as to provide a high number of sites for adsorption of all sorts of organic and inorganic materials. The ceramic candle 28 was purchased from Portacel Ltd. of Tonbridge, England under the tradename "British Berkefeld" and is referred to by them as a "Standard Water filter Element". It has a pore size of one-half (0.5) microns and is proven effective in screening bacteria. The ceramic candle 28 may additionally have a bacteriostatic material, such as silver nitrate impregnated throughout the ceramic candle, such that any bacteria which is not filtered out by the ceramic candle, which has a very fine porous structure, are nevertheless killed by the silver such that they do not pose any health problems to those drinking water filtered by the filter of the invention. The candle is hollow, as shown; in this way uniform radially inward flow is ensured.

As will be understood by those skilled in the art, the pre-filter and the ceramic filter both act as mechanical filters; that is providing a maximum pore size such that particles are screened from the water. The carbon, however, acts as an adsorber, i.e., a "chemical filter" by which impurities are chemically attached to bonding sites in the activated carbon member. The physical pore size of the carbon may be on the order of (50) microns.

It should further be understood that the ceramic filter element is also a highly effective flow regulator, in that it successfully confines the flow of water through the unit to a rate which ensures proper contact time within the very critical carbon adsorption filter stage, and does so over a wide range of influent water pressures with a relatively constant effluent flow rate.

As shown in FIGS. 1 and 2, an additional screen member 38 may be imposed between the ceramic candle and the activated carbon member 26 to prevent erosion of the carbon in use. This might be of polypropylene, for example. An additional paper or cloth interleaf member 40 may also be provided to ensure filtration on the inside surface of the carbon material as well.

The canister 10 may be provided in both cap 14 and body portions 12 with spaced recesses 42 for interaction with a spanner wrench 44 shown in phantom, so that the threaded connection may be made firmly by means of thread 18. As shown the ceramic candle may be attached to a threaded nipple 46 so that it can be simply threaded into engagement with the cap member 14 and be sealed thereto by O-ring 50. In the prototypical version tested and discussed above, the ceramic candle 28 is supplied by Portacel Ltd. with the nipple attached. The threaded nipple 46 is used to engage outlet pipe means shown in phantom at 48.

In the presently envisioned preferred embodiment of the invention the cap 14 and the body portion 12 of the container 10 are both injection molded of a talc-filled polypropylene plastic material.

In the successfully tested embodiment of the invention, the relative dimensions of the unit were generally as shown in FIGS. 1 and 2. The embodiment tested operated successfully in a household water environment where the typical water pressure was 85 psi static, 55 psi flowing. The overall dimension of the carbon filter assembly is approximately 4¾ inches diameter by 9 inches high. The ceramic filter assembly is typically 2¼ inches in diameter by 10½ inches long. The volume of activated carbon is thus about 120 cubic inches, or approximately ½ gallon; used in conjunction with ⅛ inch standard piping, and in consideration of the flow regulation features of the ceramic element, provides a typical flow rate of 1 to 2 gallons/minute and an average residence time of the water in the carbon filter bed on the order of 3 seconds.

FIG. 3 shows an alternative embodiment of the invention in cross-section. Again, the body portion 12A of the container holds pre-filter 24A, carbon filter 26A and ceramic candle 28A. However, in this case additional baffles members 54 and 52 are interposed between the prefilter and the carbon filter and the carbon filter and the ceramic candle, respectively. The baffles 52 and 54 are provided with longitudinally extending slits which as shown are diametrically opposed from one another when the assembly is made, so as to ensure that the water flow pattern through the carbon is generally circumferential, as shown by the arrows. This water flow pattern provides additional residence time of the water within the carbon which may be desirable in certain environments and under certain circumstances. It will be appreciated by those skilled in the art that typically the baffles would be sized to fit the carbon filter more tightly than shown in FIG. 3; they are separated for clarity.

There are also various other modifications that can be made to the water purification device of the invention which can be selected by those skilled in the art on the basis of the cost of manufacture of the device and the efficacy of filtering provided. For example, it may be desirable for manufacturing convenience to use an extruded carbon tube member rather than a wrapped member as shown in FIGS. 1 and 2. Such a carbon tube is sold under the trademark SCHUMASORB by Universal Porosics Co., of La Grange, Ill. This expedient would eliminate the interleaving 40 and the inner screen 38 because it is self-supporting and non-eroding. Another possibility would be simply to use the inner screen 38 as shown in FIG. 2 and place loose granular carbon between this screen and the pre-filter 24A. This would be particularly easy if the prefilter were a tube formed of a rigid foam material as shown in FIG. 3, such as the cellulose melamine foam sold by Corning, Inc. This sort of foam is available in various tubing sizes, for example, a tube having a wall thickness of perhaps ½ inch could be used. This would prevent any purging through of contaminants collecting on the prefilter's outer surface, though it is true that such a foam tube has less surface than does the pleated paper filter shown in FIGS. 1 and 2.

It will be appreciated that there has been described a water purification device substantially achieving the objects of the invention discussed above. The design of the several filters used is such that the relative sizings of the carbon and ceramic filters are appropriate for their function, while means are provided to ensure that the water flow is substantially uniform and regulated so that all of the filtration media provided are effectively employed.

While several preferred embodiments of the invention have been described it should be appreciated that numerous additional modifications and improvements thereto are possible and accordingly that the scope of the invention should not be construed to be limited by the above disclosure but only by the following claims.

I claim:

1. A filter for removing impurities from water, comprising:
    a single sealable container having an inlet port and an outlet port;
    a first pre-filter;
    a second activated carbon-filter;
    a third ceramic microscreen filter; and
    means for establishing a uniform water flow pattern and regulated flow rate from said inlet port through said first, second and third filters and thence to said outlet port, with the regulation of the rate of flow being provided by the properties of the ceramic material chosen for the final filter stage.

2. The filter of claim 1 wherein said ceramic filter has a pore size of one-half (0.5) microns.

* * * * *